United States Patent
Kikuchi

(10) Patent No.: US 11,861,738 B2
(45) Date of Patent: Jan. 2, 2024

(54) CULTIVATION-TARGET CROP SELECTION ASSISTING APPARATUS, CULTIVATION-TARGET CROP SELECTION ASSISTING METHOD, AND COMPUTER-READABLE RECORDING MEDIUM

(71) Applicant: NEC Corporation, Tokyo (JP)

(72) Inventor: Yusuke Kikuchi, Tokyo (JP)

(73) Assignee: NEC Corporation, Tokyo (JP)

( * ) Notice: Subject to any disclaimer, the term of this patent is extended or adjusted under 35 U.S.C. 154(b) by 606 days.

(21) Appl. No.: 16/979,670

(22) PCT Filed: Mar. 11, 2019

(86) PCT No.: PCT/JP2019/009789
§ 371 (c)(1),
(2) Date: Sep. 10, 2020

(87) PCT Pub. No.: WO2019/176879
PCT Pub. Date: Sep. 19, 2019

(65) Prior Publication Data
US 2021/0027397 A1 Jan. 28, 2021

(30) Foreign Application Priority Data
Mar. 16, 2018 (JP) .................. 2018-050198

(51) Int. Cl.
*A01G 7/00* (2006.01)
*G06Q 50/02* (2012.01)
(52) U.S. Cl.
CPC .............. *G06Q 50/02* (2013.01); *A01G 7/00* (2013.01)
(58) Field of Classification Search
CPC ............ G06Q 50/02; G06Q 10/06315; G06Q 10/06313; G06Q 10/04; A01G 22/00;
(Continued)

(56) References Cited

U.S. PATENT DOCUMENTS 9,652,840 B1 * 5/2017 Shriver ................. G06T 7/0004
2013/0282423 A1 10/2013 Hori et al.
(Continued)

FOREIGN PATENT DOCUMENTS

CA 2697608 A1 9/2011
CN 106056457 A 10/2016
(Continued)

OTHER PUBLICATIONS

Extended European Search Report for EP Application No. 19768093.7 dated May 3, 2021.
(Continued)

*Primary Examiner* — Jeffrey P Aiello
(74) *Attorney, Agent, or Firm* — Michael Dryja

(57) ABSTRACT

A cultivation-target crop selection assisting apparatus 10 includes: an information collection unit 11 configured to collect information regarding a specific cultivated land; a prediction value calculation unit 12 configured to calculate a prediction value of actual performance of cultivation of one or a plurality of varieties of crops in the specific cultivated land by applying the information collected by the information collection unit 11 to a prediction model 14 created by performing machine learning on a relationship between information regarding a sample cultivated land and actual performance information regarding a crop produced in the sample cultivated land; and a crop selection unit 13 configured to select a crop that is suitable for being cultivated in the specific cultivated land based on the prediction value calculated for the one or plurality of varieties of crops.

9 Claims, 8 Drawing Sheets

(58) Field of Classification Search
CPC ...... A01G 7/00; A01G 17/005; A01B 79/005;
A01B 79/02; A01B 69/008; A01C
21/005; A01C 21/00; G06N 20/00; G06N
5/04; G06N 3/126; G06N 3/08; G06N
3/006; G06N 7/01; G06N 3/02; G01N
33/0098; G01N 33/24; G01N 2033/245;
G06V 20/188
USPC .................. 111/200; 382/110, 181; 700/284;
702/2, 19, 188–189
See application file for complete search history.

(56) References Cited

U.S. PATENT DOCUMENTS

| | | | | |
|---|---|---|---|---|
| 2014/0012732 A1* | 1/2014 | Lindores | .............. | A01B 79/005 705/37 |
| 2016/0147962 A1* | 5/2016 | Vollmar | ................ | H04W 4/029 705/2 |
| 2016/0224703 A1* | 8/2016 | Shriver | .............. | G06Q 10/0631 |
| 2018/0035605 A1* | 2/2018 | Guan | .................... | G06V 20/188 |
| 2018/0211156 A1* | 7/2018 | Guan | ..................... | G06N 3/044 |
| 2019/0057460 A1 | 2/2019 | Sakaguchi et al. | | |
| 2020/0196535 A1* | 6/2020 | Dagondon | ........... | G05B 13/021 |

FOREIGN PATENT DOCUMENTS

| | | |
|---|---|---|
| CN | 107680000 A | 2/2018 |
| JP | 2000-083476 A | 3/2000 |
| JP | 2003-006247 A | 1/2003 |
| JP | 2005-080514 A | 3/2005 |
| JP | 2010-166851 A | 8/2010 |
| JP | 2011-254711 A | 12/2011 |
| JP | 2011254711 A * | 12/2011 |
| JP | 2012-137819 A | 7/2012 |
| JP | 2015-219651 A | 12/2015 |
| JP | 2017-072900 A | 4/2017 |
| WO | 2017/164097 A1 | 9/2017 |

OTHER PUBLICATIONS

International Search Report for PCT Application No. PCT/JP2019/009789, dated May 21, 2019.

Japanese Office Action for JP Application No. 2018-050198 dated Dec. 18, 2019 with English Translation.

English translation of Written opinion for PCT Application No. PCT/JP2019/009789, dated May 21, 2019.

* cited by examiner

Fig.3

| CULTIVATED LAND | YIELD | SUGAR CONTENT | VARIETY | CONTENT RATE OF SAND | PH | NITROGEN CONTENT | AVERAGE TEMPERATURE | ... |
|---|---|---|---|---|---|---|---|---|
| A | 100t/ha | 5.0% | 1 | 30% | 5.9 | 10mg | 22.4°C | |
| B | 80t/ha | 6.0% | 2 | 40% | 6.1 | 40mg | 24.5°C | |
| C | 120t/ha | 5.5% | 1 | 50% | 5.7 | 20mg | 19.8°C | |
| ... | | | | | | | | |

[YIELD PREDICTION MODEL]
VARIETY 1: YIELD = CONTENT RATE OF SAND × 0.5 + NITROGEN CONTENT × 0.9 + AVERAGE TEMPERATURE × 0.2 +...
VARIETY 2: YIELD = CONTENT RATE OF SAND × 0.4 + NITROGEN CONTENT × 0.7 + pH × 0.3 + AVERAGE TEMPERATURE × 0.5 +...

[SUGAR CONTENT PREDICTION MODEL]
VARIETY 1: SUGAR CONTENT = CONTENT RATE OF SAND × 0.2 + NITROGEN CONTENT × 0.2 + pH × 0.3 + AVERAGE TEMPERATURE × 0.5 +...
VARIETY 2: SUGAR CONTENT = CONTENT RATE OF SAND × 0.1 + NITROGEN CONTENT × 0.3 + AVERAGE TEMPERATURE × 0.6 +...

CULTIVATION-TARGET CROP SELECTION ASSISTING APPARATUS, CULTIVATION-TARGET CROP SELECTION ASSISTING METHOD, AND COMPUTER-READABLE RECORDING MEDIUM

This application is a National Stage Entry of PCT/JP2019/009789 filed on Mar. 11, 2019, which claims priority from Japanese Patent Application 2018-050198 filed on Mar. 16, 2018 the contents of all of which are incorporated herein by reference, in their entirety.

TECHNICAL FIELD

The invention relates to a cultivation-target crop selection assisting apparatus and a cultivation-target crop selection assisting method that are for assisting a user in selecting a crop that is suitable for being cultivated in a cultivated land. Furthermore, the invention relates to a computer-readable recording medium on which a program for realizing the apparatus and the method is recorded.

BACKGROUND ART

Conventionally, in open-field cultivation, the type of agricultural crops planted in a cultivated land is freely determined by the grower based on the climate of the area in which the cultivated land is located, the amount of sunlight, the soil properties, market demand, and so on. Therefore, after planting is complete, there is the possibility of the situation in which, for example, the planned yield cannot be obtained or the quality of the crops is low occurring due to the cultivated land being not suitable for the crop.

In view of such a situation, a technology for selecting a crop that is suitable for a cultivated land has been disclosed (e.g. see Patent Documents 1 and 2). Specifically, Patent Document 1 discloses a system for presenting the most suitable crop for the cultivated land. The system disclosed in Patent Document 1 selects the most suitable crop by matching the result of analysis of the soil of the cultivated land, obtained from a soil analyzing apparatus, with a database in which soil conditions are registered for each variety of crop, and displays the selected crop on the screen. This system can also specify measures for soil improvement by, upon a crop being specified, comparing soil conditions that are suitable for the specified crop with the result of analysis by the soil analyzing apparatus.

Patent Document 2 also discloses a system for presenting the most suitable crop for the cultivated land. The system disclosed in Patent Document 2 proposes the crop to be planted based on soil analysis information that indicates the components of the soil of the cultivated land, market price information regarding crops, cultivation information regarding crops, and annual weather information regarding the area in which cultivated land is located.

LIST OF RELATED ART DOCUMENTS

Patent Documents

Patent Document 1: Japanese Patent Laid-Open Publication No. 2000-83476
Patent Document 2: Japanese Patent Laid-Open Publication No. 2005-80514

SUMMARY OF INVENTION

Problems to be Solved by the Invention

However, with the system disclosed in Patent Document 1, it is necessary to collect a huge amount of data in advance and build a database in advance. The construction of such a database requires knowledge of a skilled grower or expert, and it takes time and costs. The system disclosed in Patent Document 2 also requires a similar database, and there is the same problem.

One example of an object of the invention is to solve the above-described problem and provide a cultivation-target crop selection assisting apparatus, a cultivation-target crop selection assisting method, and a computer-readable recording medium that can make it possible to select a crop that is suitable for being cultivated in the target cultivated land, without specialized knowledge.

Means for Solving the Problems

To achieve the above-described object, a cultivation-target crop selection assisting apparatus according to one aspect of the invention includes:

an information collection unit configured to collect information regarding a specific cultivated land;

a prediction value calculation unit configured to calculate a prediction value of actual performance of cultivation of one or a plurality of varieties of crops in the specific cultivated land by applying the information collected by the information collection unit to a prediction model created by performing machine learning on a relationship between information regarding a sample cultivated land and actual performance information regarding a crop produced in the sample cultivated land; and a crop selection unit configured to select a crop that is suitable for being cultivated in the specific cultivated land based on the prediction value calculated for the one or plurality of varieties of crops.

To achieve the above-described object, a cultivation-target crop selection assisting method according to one aspect of the invention includes:

(a) a step of collecting information regarding a specific cultivated land;

(b) a step of calculating a prediction value of actual performance of cultivation of one or a plurality of varieties of crops in the specific cultivated land by applying the information collected by the information collection unit to a prediction model created by performing machine learning on a relationship between information regarding a sample cultivated land and actual performance information regarding a crop produced in the sample cultivated land; and (c) a step of selecting a crop that is suitable for being cultivated in the specific cultivated land based on the prediction value calculated for the one or plurality of varieties of crops.

Furthermore, to achieve the above-described object, a computer-readable recording medium according to one aspect of the invention includes a program recorded thereon, the program including instructions that cause a computer to carry out:

(a) a step of collecting information regarding a specific cultivated land;

(b) a step of calculating a prediction value of actual performance of cultivation of one or a plurality of varieties of crops in the specific cultivated land by applying the information collected by the information collection unit to a prediction model created by performing machine learning on a relationship between information regarding a sample cultivated land and actual performance information regarding a crop produced in the sample cultivated land; and (c) a step of selecting a crop that is suitable for being cultivated in the specific cultivated land based on the prediction value calculated for the one or plurality of varieties of crops.

Advantageous Effects of the Invention

As described above, with the invention, it is possible to select a crop that is suitable for being cultivated in a target cultivated land, without specialized knowledge.

BRIEF DESCRIPTION OF THE DRAWINGS

FIG. 3(a) is a diagram showing examples of objective variables and explanatory variables used to create a prediction model in the first example embodiment of the invention, and FIG. 3(b) is a diagram showing examples of prediction models created in the first example embodiment of the invention.

EXAMPLE EMBODIMENTS

First Example Embodiment

The following describes a cultivation-target crop selection assisting apparatus, a cultivation-target crop selection assisting method, and a program according to a first example embodiment of the invention with reference to FIGS. 1 to 5.

Apparatus Configuration

Figure 1:
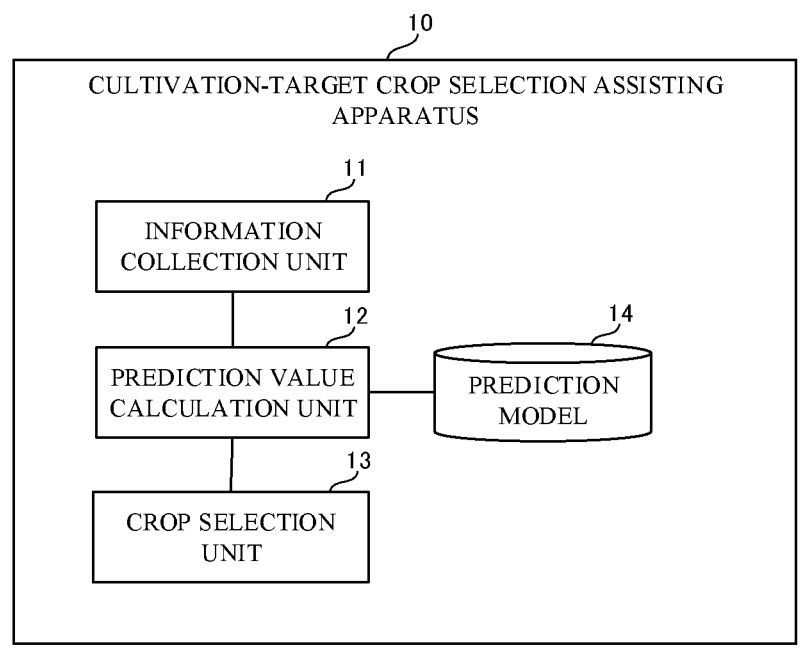
FIG. 1 is a block diagram showing an overall configuration of a cultivation-target crop selection assisting apparatus according to a first example embodiment of the invention.

First, an overall configuration of a cultivation-target crop selection assisting apparatus according to the first example embodiment will be described. FIG. 1 is a block diagram showing an overall configuration of a cultivation-target crop selection assisting apparatus according to the first example embodiment of the invention.

A cultivation-target crop selection assisting apparatus 10 according to the present example embodiment, which is shown in FIG. 1, is an apparatus that assists a user, who is an agricultural business operator, in selecting a cultivation-target crop in a specific cultivated land. As shown in FIG. 1, the cultivation-target crop selection assisting apparatus 10 includes an information collection unit 11, a prediction value calculation unit 12, and a crop selection unit 13.

The information collection unit 11 collects information regarding a specific cultivated land. The prediction value calculation unit 12 calculates prediction values of actual performance of cultivation of one or a plurality of varieties of crops in a specific cultivated land by applying information collected by the information collection unit 11 to a prediction model 14. The prediction model is a model created by performing machine learning on a relationship between information regarding sample cultivated lands and actual performance information regarding the crops produced in the sample cultivated lands. The crop selection unit 13 selects a crop that is suitable for a specific cultivated land based on the prediction values calculated for one or a plurality of varieties of crops.

In this way, in the first example embodiment, prediction values for a case in which a crop is cultivated in the cultivated land can be obtained by simply applying information regarding the cultivated land to the prediction model 14, and also a crop that is suitable for being cultivated is selected. Therefore, with the first example embodiment, the user can select a crop that is suitable for being cultivated in the cultivated land without specialized knowledge.

Figure 2:
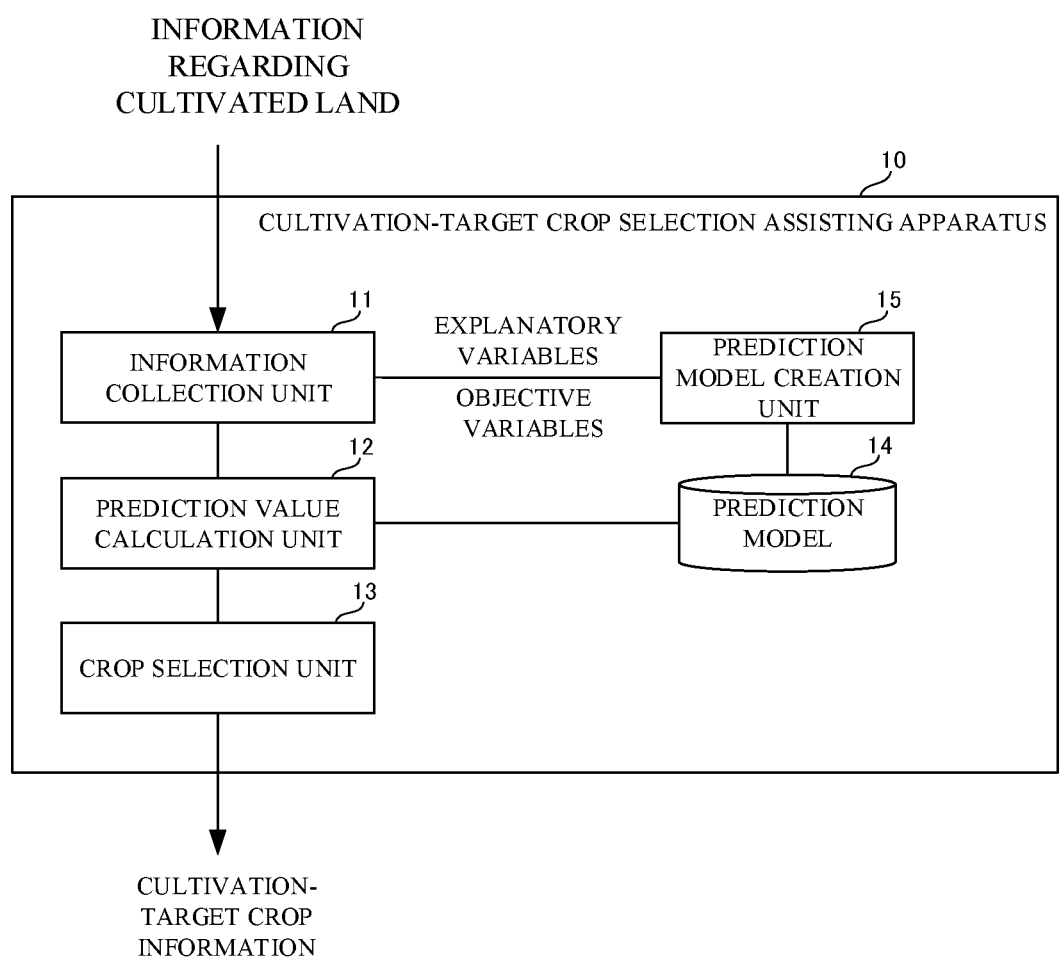
FIG. 2 is a block diagram showing a specific configuration of the cultivation-target crop selection assisting apparatus according to the example embodiment of the invention.

Next, a specific configuration of the cultivation-target crop selection assisting apparatus according to the first example embodiment will be described with reference to FIG. 2. FIG. 2 is a block diagram showing a specific configuration of the cultivation-target crop selection assisting apparatus according to the example embodiment of the invention.

As shown in FIG. 2, the cultivation-target crop selection assisting apparatus 10 according to the first example embodiment includes a prediction model creation unit 15 in addition to the information collection unit 11, the prediction value calculation unit 12, and the crop selection unit 13 described above. The prediction model creation unit 15 creates the prediction model 14 by performing machine learning, using information regarding sample cultivated lands as explanatory variables, and actual performance information regarding the crops produced in the sample cultivated lands as objective variables.

Here, examples of "actual performance information regarding crops", which serve as objective variables, include yield, quality, sales (profit), and so on. Examples of quality include pH, color, viscosity, sugar content (Brix), lycopene content, polyphenol content, sensory test results, and so on. The value of a quality may be any of an average value, a maximum value, and a minimum value.

"Information regarding a cultivated land" collected by the information collection unit 11 and "information regarding cultivated lands" that serves as explanatory variables may be information that includes information regarding the variety of the cultivated crop, information regarding the properties of the soil in the cultivated land, and environmental information regarding the cultivated land.

Examples of "information regarding the properties of the soil" include the physical properties of the soil, the chemical properties of the soil, the biological properties of the soil, the position coordinates (latitude and longitude) of the cultivated land, and so on. More specifically, examples of the physical properties of the soil include the content rates of specific components (clay, silt, sand, and so on), the mass of unit volume, the saturated hydraulic conductivity, the water retention curve, and so on. Examples of the chemical properties of the soil include the pH, the content rates of specific elements, the cation exchange capacity, the electrical conductivity, and so on. Examples of the biological properties of the soil include soil biota (the species and the volume of organisms present in the soil), and so on.

Examples of "environmental information regarding the cultivated land" includes weather information, farming information, and so on. More specifically, examples of weather information include the temperature, the humidity, the solar radiation amount, the wind speed, the wind direction, the rainfall amount, and so on, per unit time, for example. Farming information include the amount of irrigation, the amount of fertilizer applied, the amount of chemical sprayed, the number of times plowing is performed, the number of times weeding is performed, and so on, per predetermined period, for example.

The prediction model creation unit 15 can perform machine learning on the above-described explanatory variables and objective variables, using linear regression (multiple regression, Ridge regression, lasso, fused lasso, principal component regression, partial least square regression, or the like), or non-linear regression (a decision tree, a Gaussian process, neural networks, or the like). A method for training a prediction model may be determined in advance, or automatically selected from among a plurality of methods. In the latter case, the prediction model creation unit 15 applies a plurality of methods to the above-described explanatory variables and objective variables, and adopts the method with which indicators that have been determined in advance (the prediction error, the calculation time, and so on) defined in advance are optimal values. The following describes a specific example of the prediction model 14.

For example, the prediction model creation unit 15 generates a prediction model expressed by Math 1 shown below for each of varieties 1, 2, . . . and n, where an objective variable y denotes an indicator to which attention is paid (yield, sugar content, sales, or the like) and x denotes an explanatory variable.

$$y = f_1(x) : \text{Prediction Model for Variety 1} \quad \text{Math. 1}$$
$$y = f_2(x) : \text{Prediction Model for Variety 2}$$
$$\ldots$$
$$y = f_n(x) : \text{Prediction Model for Variety } n$$

In this case, the prediction value calculation unit 12 inputs, for example, the content rate of sand, the pH, the nitrogen content, the average temperature, and so on of a specific cultivated land, collected by the information collection unit 11, to each prediction model, as an explanatory variable vector x, and calculates a prediction value y for each variety. The crop selection unit 13 selects the variety with the highest prediction value y as a crop suitable for being cultivated.

If there are two indicators to which attention is paid, objective variables $y_1$ and $y_2$ and the explanatory variable vector x are used. In this case, the prediction model creation unit 15 generates, for each of varieties 1, 2, . . . and n, the prediction model expressed by Math. 2 shown below regarding an objective variable $y_1$, and the prediction model expressed by Math. 3 shown below regarding an objective variable $y_2$.

$$y_1 = f_{11}(x) : \text{Prediction Model regarding } y_1 \text{ for Variety 1} \quad \text{Math. 2}$$
$$y_1 = f_{12}(x) : \text{Prediction Model regarding } y_1 \text{ for Variety 2}$$
$$\ldots$$
$$y_1 = f_{1n}(x) : \text{Prediction Model regarding } y_1 \text{ for Variety } n$$

$$y_2 = f_{21}(x) : \text{Prediction Model regarding } y_2 \text{ for Variety 1} \quad \text{Math. 3}$$
$$y_2 = f_{22}(x) : \text{Prediction Model regarding } y_2 \text{ for Variety 2}$$
$$\ldots$$
$$y_2 = f_{2n}(x) : \text{Prediction Model regarding } y_2 \text{ for Variety } n$$

In this case, the prediction value calculation unit 12 inputs the content rate of sand, the pH, the nitrogen content, the average temperature, and so on of a specific cultivated land, collected by the information collection unit 11, to each prediction model, as the explanatory variable vector x, and calculates prediction values $y_1$ and $y_2$ for each variety.

If there are two indicators to which attention is paid, for example, the function expressed by Math. 4 or Math. 5 shown below is defined. Therefore, the crop selection unit 13 calculate the value of y using the functions expressed by Math. 4 or Math. 5 shown below, and selects the variety with the highest value of y as a crop suitable for being cultivated. Note that whether to use Math. 4 or Math. 5 can be freely set by the system administrator or the user according to the objective variables. In the function expressed by Math. 4, weights $w_1$ and $w_2$ can be freely set by the system administrator or the user according to the importance levels of the objective variables.

$$y = g(y_1, y_2) = w_1 y_1 + w_2 y_2 \quad \text{Math. 4}$$

$$y = g(y_1, y_2) = y_1 y_2 \quad \text{Math. 5}$$

Here, specific examples of prediction models and selection of a crop using the prediction models will be described with reference to FIGS. 3(*a*) and 3(*b*). FIG. 3(*a*) is a diagram showing examples of objective variables and explanatory variables used to create a prediction model in the first example embodiment of the invention, and FIG. 3(*b*) is a diagram showing examples of prediction models created in the first example embodiment of the invention.

As shown in FIG. 3(*a*), in the first example embodiment, the yield and the sugar content in crops (e.g. an average value) in each cultivated land are used as objective variables. Further, the variety of the cultivated crops, the content rate of sand, the pH, the nitrogen content, the average temperature, and so on are used as explanatory variables for each cultivated land.

When the objective variables and the explanatory variables shown in FIG. 3(*a*) are used, the prediction model creation unit 15 can create a prediction model for predicting the yield and a prediction model for predicting the sugar content for each of the variety 1 and the variety 2, as shown in FIG. 3(*b*).

In this case, the prediction value calculation unit 12 inputs the content rate of sand, the pH, the nitrogen content, the average temperature, and so on of a specific cultivated land, collected by the information collection unit 11, to the prediction model 14 shown in FIG. 3(*b*), and calculates prediction values of the yield and the sugar content for each of the varieties 1 and 2.

Also, the crop selection unit 13 calculates the product of the yield and the sugar content for each variety, using Math.

5 shown above. The crop selection unit 13 selects the variety with the highest product thus calculated, as a crop suitable for being cultivated in the specific cultivated land.

For example, it is assumed here that the yield $y_1$=105 t/ha and the sugar content $y_2$=5.7% have been obtained for the variety 1, and the yield $y_1$=100 t/ha and the sugar content $y_2$=6.2% have been obtained for the variety 2. In this case, the prediction value y of the variety 1 is 5.96 and the prediction value y of the variety 2 is 6.20, and therefore the crop selection unit 13 selects the variety 2 as a crop suitable for being cultivated.

Apparatus Operations

Next, operations of the cultivation-target crop selection assisting apparatus 10 according to the first example embodiment will be described with reference to FIGS. 4 and 5. In the following description, FIGS. 1 to 3 are referenced when necessary. In the first example embodiment, a cultivation-target crop selection assisting method is performed by operating the cultivation-target crop selection assisting apparatus 10. Therefore, a description of the cultivation-target crop selection assisting method according to the first example embodiment is substituted with the following description of the cultivation-target crop selection assisting apparatus 10.

First, prediction model creating processing that is performed by the cultivation-target crop selection assisting apparatus 10 according to the first example embodiment will be described with reference to FIG. 4. FIG. 4 is a flowchart showing operations of the cultivation-target crop selection assisting apparatus according to the first example embodiment of the invention, performed when creating a prediction model.

Figure 4:
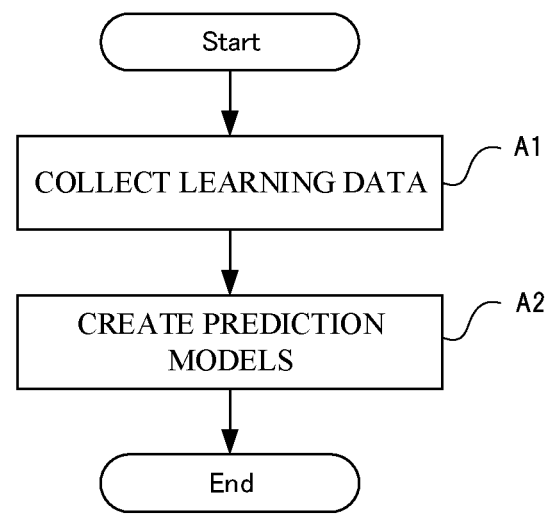
FIG. 4 is a flowchart showing operations of the cultivation-target crop selection assisting apparatus according to the first example embodiment of the invention, performed when creating a prediction model.

As shown in FIG. 4, first, the information collection unit 11 collects information regarding the cultivated land, which serves as explanatory variables, and actual performance information regarding crops, which serves as objective variables (step A1).

Specifically, the information collection unit 11 collects these kinds of information from an external database or a terminal apparatus of the user or the like, via a network such as the Internet. Also, the information collection unit 11 may collect information that can be acquired from sensors that are installed in the cultivated land, such as weather information, from such sensors.

The information (explanatory variables) regarding the cultivated land collected in step A1 may be information that was collected when the processing shown in FIG. 5 described below was performed in the past. In this case, actual performance information (objective variables) regarding crops produced in the cultivated land, collected in step A1, is preferably obtained from actual performance information of the same year as the year in which the above-described processing was performed.

Next, the prediction model creation unit 15 creates a prediction model 14 by performing machine learning using the information acquired in step A1 (step A2).

Specifically, as shown in FIG. 2, the prediction model creation unit 15 creates one or a plurality of prediction models 14 according to the indicators and the varieties to which the user pays attention. The prediction models 14 thus created are used in cultivation-target crop selection processing described below.

Next, cultivation-target crop selection processing that is performed by the cultivation-target crop selection assisting apparatus 10 according to the first example embodiment will be described with reference to FIG. 5. FIG. 5 is a flowchart showing operations of the cultivation-target crop selection assisting apparatus according to the first example embodiment of the invention, performed when selecting a cultivation-target crop.

Figure 5:
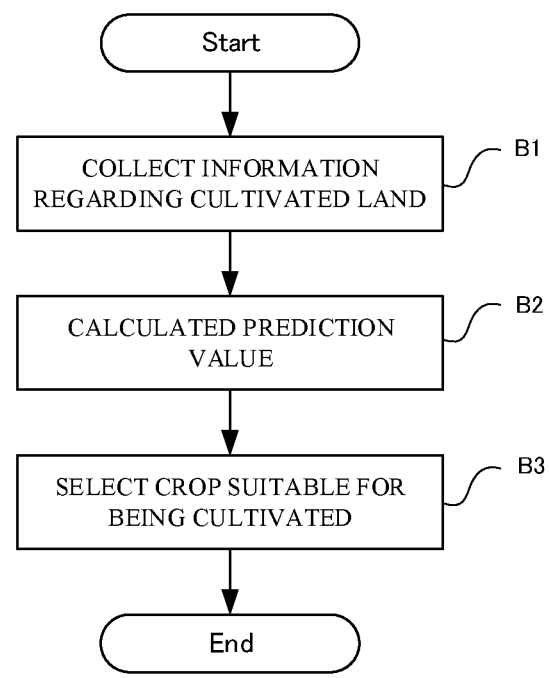
FIG. 5 is a flowchart showing operations of the cultivation-target crop selection assisting apparatus according to the first example embodiment of the invention, performed when selecting a cultivation-target crop.

As shown in FIG. 5, first, the information collection unit 11 collects information regarding a specific cultivated land that has been specified by the user (step B1).

Specifically, upon the user inputting information that specifies a cultivated land, using their own terminal apparatus, the information collection unit 11 collects information related to the cultivated land from an external database, a terminal apparatus of the user or the like, or sensors or the like installed in the cultivated land, via a network such as the Internet.

At this time, regarding information that has not been determined at the time of crop selection (e.g. weather information and farming information in the cultivation period), the information collection unit 11 collects information such as normal values or average values in the past, and uses the collected information as explanatory variables. Alternatively, if forecast values (weather forecast and the like) or planned values (a farming plan and the like) are available, the information collection unit 11 may use such values as explanatory variables.

Next, the prediction value calculation unit 12 inputs the information collected in step B1 to the prediction models 14 created in step A2 shown in FIG. 4, to calculate prediction values for the indicators and the varieties to which the user pays attention (step B2).

Next, based on the prediction values calculated in step B2, the crop selection unit 13 selects a crop that is suitable for being cultivated in the specific cultivated land (step B3). Upon performing step B3, the cultivation-target crop selection assisting apparatus 10 transmits information that specifies the selected crop (hereinafter referred to as "cultivation-target crop information") to the user's terminal apparatus. Thus, the user can be informed of the crop that is suitable for being cultivated in the specified cultivated land.

Effects of First Example Embodiment

As described above, according to the first example embodiment, the user can be informed of the crop that is suitable for being cultivated in a cultivated land by only preparing information regarding the cultivated land. That is to say, according to the first example embodiment, the user can select a crop that is suitable for being cultivated in the cultivated land without specialized knowledge.

Modification

Next, a modification of the present example embodiment will be described. In the present modification, "information regarding a cultivated land" collected by the information collection unit 11 and "information regarding cultivated lands" that serves as explanatory variables include soil optical reflectance spectrum data measured in a cultivated land. Specifically, soil optical reflectance spectrum data may be used as information regarding the properties of the soil in a cultivated land.

Soil optical reflection spectrum data is data obtained by measuring the reflectance of light of various wavelengths applied to the ground surface of a cultivated land. Examples of soil optical reflection spectrum data include multispectral sensor data, multispectral camera data, hyperspectral sensor data, and hyperspectral camera data.

Soil optical reflection spectrum data is measured using a dedicated measuring device such as a multispectral sensor, a multispectral camera, a hyperspectral sensor, or a hyperspectral camera. Example of measurement methods include a method in which an operator directly measures the ground surface (bare ground) using a measuring device, at a representative point in a measurement-target cultivated land, and a method in which a measuring device is mounted on a flying body such as a drone, a balloon, or an aircraft, or a satellite, and measurement is performed from above.

Data obtained by the measuring device can only be obtained from the ground surface, and therefore it is preferable that the soil has been cultivated and agitated in advance using a cultivator or the like so as to be homogenized to some extent, from the surface to the cultivated soil layer.

When a multispectral sensor or a hyperspectral sensor is used as a measuring device, the measuring ranger is narrow, and therefore it is preferable to set a plurality of representative points in the cultivated land and perform measurement at each point. On the other hand, when a multispectral camera or a hyperspectral camera is used as a measuring device, the measurement range is wide, and therefore measurement may be performed from high altitude so that the entire measurement-target cultivated land is within the angle of view, or performed by capturing an image of the entire cultivated land as a plurality of divided images, and combining these images like a mosaic.

Soil optical reflectance spectrum data may be used as a substitute for the physical properties of the soil, the chemical properties of the soil, and the biological properties of the soil described above, or may be used in combination therewith. Soil optical reflectance spectrum data can be easily acquired compared to the physical properties of the soil, the chemical properties of the soil, and the biological properties. Therefore, in the former case, it is possible to reduce the operation costs of the cultivation-target crop selection assisting apparatus 10. On the other hand, in the latter case, the selection accuracy can be improved.

Program

A program according to the present example embodiment need only be a program that causes a computer to carry out steps A1 and A2 shown in FIG. 4 and steps B1 to B3 shown in FIG. 5. By installing such a program in a computer and executing the program, it is possible to realize the cultivation-target crop selection assisting apparatus 10 and the cultivation-target crop selection assisting method according to the first example embodiment. In this case, a processor of the computer functions as the information collection unit 11, the prediction value calculation unit 12, the crop selection unit 13, and the prediction model creation unit 15, and performs processing.

The program according to the first example embodiment may be executed by a computer system that is constituted by a plurality of computers. In such a case, the computers may respectively function as the information collection unit 11, the prediction value calculation unit 12, the crop selection unit 13, and the prediction model creation unit 15.

Second Example Embodiment

Figure 6:
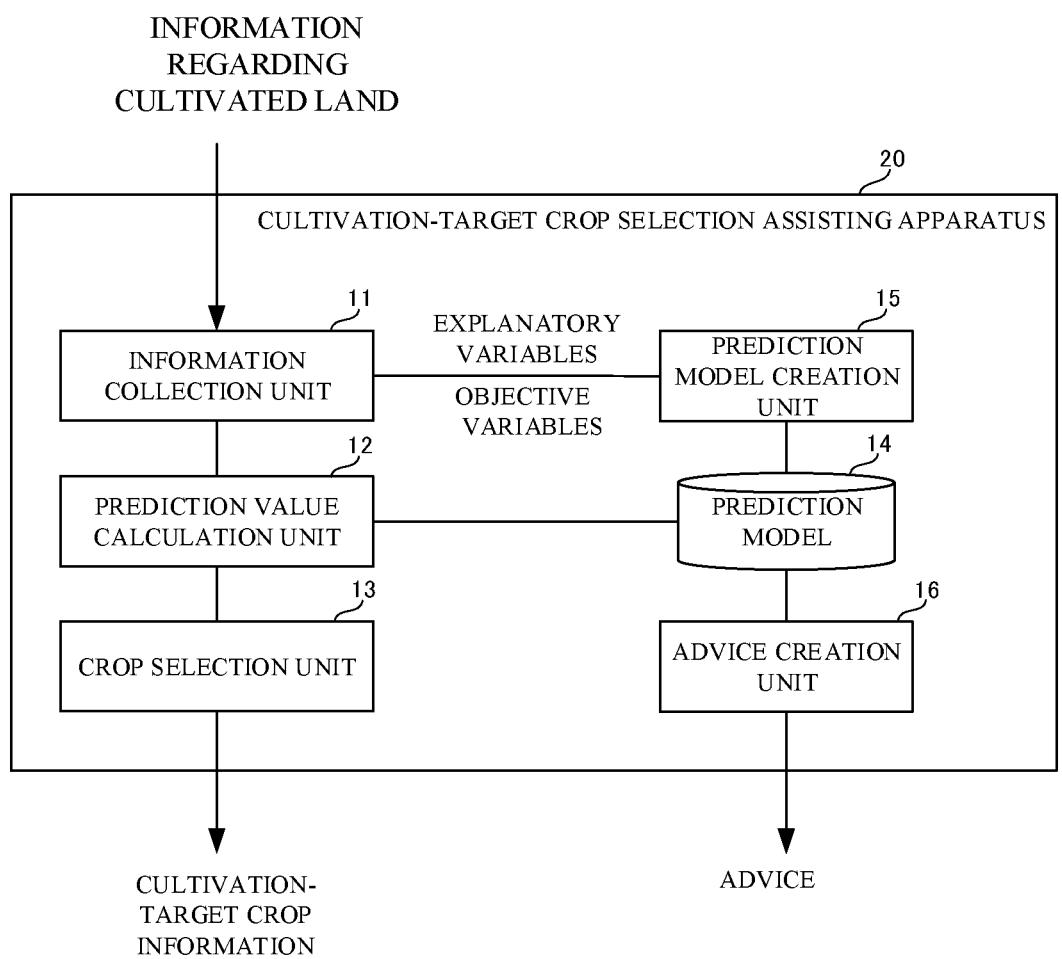
FIG. 6 is a block diagram showing an overall configuration of a cultivation-target crop selection assisting apparatus according to a second example embodiment of the invention.
Figure 7:
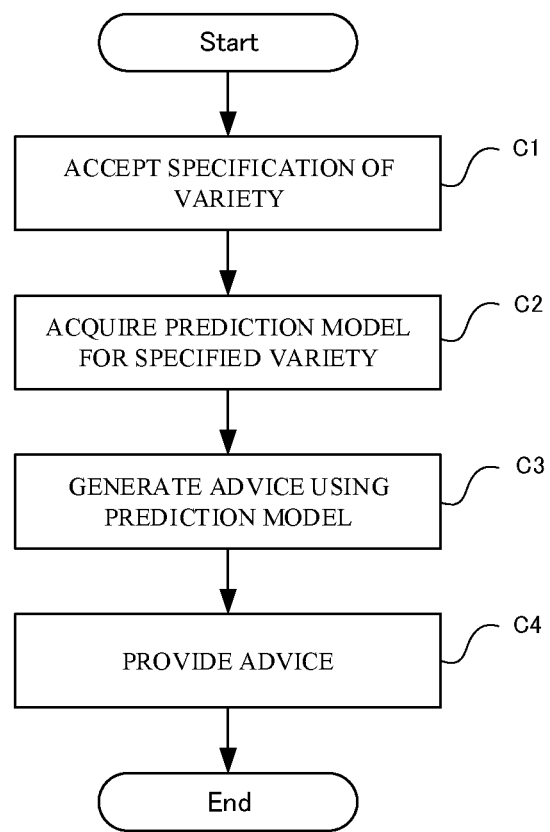
FIG. 7 is a flowchart showing operations of the cultivation-target crop selection assisting apparatus according to the second example embodiment of the invention, performed when creating an advice.

The following describes a cultivation-target crop selection assisting apparatus, a cultivation-target crop selection assisting method, and a program according to a second example embodiment of the invention with reference to FIGS. 6 and 7.

Apparatus Configuration

First, a configuration of a cultivation-target crop selection assisting apparatus according to the second example embodiment will be described. FIG. 6 is a block diagram showing an overall configuration of a cultivation-target crop selection assisting apparatus according to the second example embodiment of the invention.

As shown in FIG. 2, a cultivation-target crop selection assisting apparatus 20 according to the second example embodiment also includes an advice creation unit 16 in addition to the components of the cultivation-target crop selection assisting apparatus according to the first example embodiment shown in FIGS. 1 and 2. That is to say, the cultivation-target crop selection assisting apparatus 20 includes the information collection unit 11, the prediction value calculation unit 12, the crop selection unit 13, the prediction model creation unit 15, and the advice creation unit 16.

Among these components, the information collection unit 11, the prediction value calculation unit 12, the crop selection unit 13, and the prediction model creation unit 15 in the second example embodiment function in the same manner as in the first example embodiment. In addition, "Information regarding a cultivated land" collected by the information collection unit 11 and "information regarding cultivated lands" that serves as explanatory variables in the second example embodiment also include information regarding properties of the soil of the cultivated land.

The advice creation unit 16 creates an advice on how to improve the soil of a specific cultivated land, based on the weights set to the explanatory variables in the prediction model 14, or the amounts of changes in the objective variables when the explanatory variables are changed.

Here, the following describes the functions of the advice creation unit 16 in further details. First, a case in which the prediction model 14 is a linear model created based on linear regression will be described.

For example, an objective variable y denotes an indicator to which attention is paid, $x_{soil}$ denotes an explanatory variable related to the properties of the soil, and $x_{other}$ denotes another kind of explanatory variable. In this case, prediction models expressed by Math. 6 shown below are created by the prediction model creation unit 15. Note that "constant" is a term that collectively expresses constant terms.

$$y = f_1(x_{soil}, x_{other}) + \text{constant}: \text{Prediction Model for Variety 1} \quad \text{Math. 6}$$

$$y = f_2(x_{soil}, x_{other}) + \text{constant}: \text{Prediction Model for Variety 2}$$

$$\ldots$$

$$y = f_n(x_{soil}, x_{other}) + \text{constant}: \text{Prediction Model for Variety } n$$

The following discusses the case of the variety 1 in Math. 6 shown above. The function $f_1$ is a linear model, and therefore the prediction model for the variety 1 expressed by Math. 6 above can be expressed by Math. 7 shown below, using a weight vectors $w_{soil}$ and $w_{other}$ obtained through training using learning data.

$$y = w_{soil}^T x_{soil} + w_{other}^T x_{other} + \text{constant} \quad \text{Math. 7}$$

Therefore, the advice creation unit 16 specifies an explanatory variable of which the weight is positive, and creates an advice regarding a soil improvement for increasing the specified explanatory variable. The advice creation unit 16 also transmits the created advice to the terminal apparatus of the user.

For example, when the yield is the objective variable, if the weight on the nitrogen content in the soil, which is an explanatory variable, is a positive value, the yield can be increased by putting a nitrogen fertilizer to increase the nitrogen content in the soil. Therefore, in such a case, the advice creation unit 16 creates an advice that instructs the user to put a nitrogen fertilizer. On the other hand, if the weight on the nitrogen content in the soil, which is an explanatory variable, is a negative value, the advice creation unit 16 creates an advice that instructs the user not to put a nitrogen fertilizer any more.

Also, the advice creation unit 16 can calculate soil properties for maximizing the objective variable y all at once by setting a feasible range (the upper limit and the lower limit) for each soil property $x_{soil}$ and performing linear optimization.

Furthermore, the advice creation unit 16 can creates an advice as described above for each variety, and predict the potential maximum value of y resulting from soil improvement. In such a case, the most suitable variety under the given condition x may be different from the variety that will be the most suitable when the soil improvement is performed based on the advice. Therefore, the advice creation unit 16 may provide the user with two options, namely the variety that is suitable when the soil improvement is not performed, and the most suitable variety when the soil improvement is performed and required soil property value. The user can realize that there are two options, and can select one of them.

In addition, in the second example embodiment, the prediction model creation unit 15 can collect a pre-farming soil analysis result $x_{before}$ before farming such as fertilization that changes the soil properties is performed, the content $x_{activity}$ of farming performed thereafter, and a post-farming soil analysis result $x_{soil}$ after farming is performed, from the information collection unit 11. In such a case, the prediction model creation unit 15 can model the effect of the farming on the soil properties. When modeling is performed based on linear regression, the model that can be obtained is as shown in Math. 8 shown below.

$$x_{soil} = w_{before}^T \cdot x_{before} + w_{activity}^T \cdot x_{activity} + \text{constant} \qquad \text{Math. 8}$$

In this case, the advice creation unit 16 can derive the farming necessary for realizing the required soil property value by using the model shown in Math. 8. The result of substituting Math. 8 into Math. 7 is as shown in Math. 9 shown below.

$$y = w_{soil}^T \cdot x_{soil} + w_{other}^T \cdot x_{other} + \text{constant} = \qquad \text{Math. 9}$$
$$w_{soil}^T \cdot (w_{before}^T \cdot x_{before} + w_{activity}^T \cdot x_{activity}) +$$
$$w_{other}^T \cdot x_{other} + \text{constant}$$

When using the model shown in the above Math. 9, the advice creation unit 16 employs linear optimization to efficiently search for the farming content $x_{activity}$ that maximizes y, and thus the advice creation unit 16 can provide the user with the obtained content of farming.

Soil optical reflectance spectrum data may be used in the second example embodiment as well, as information regarding the properties of the soil in a cultivated land. Here, when $x_{spectrum}$ denotes soil optical reflectance spectrum, the prediction model modeled based on linear regression for the objective variable y, which is an indicator to which attention is paid, can be expressed by Math. 10 shown below.

$$y = w_{spectrum}^T \cdot x_{spectrum} + w_{other}^T \cdot x_{other} + \text{constant} \qquad \text{Math. 10}$$

In this case, prediction model creation unit 15 can create a model for predicting the soil optical reflection spectrum data $x_{spectrum}$ from the explanatory variable vector (soil property data) $x_{soil}$ related to the soil properties. When modeling is performed based on linear regression, this model can be expressed by Math. 11 shown below.

$$x_{spectrum} = w_{soil}^T \cdot x_{soil} + \text{constant} \qquad \text{Math. 11}$$

Therefore, Math. 10 shown above can be expressed as Math. 12 shown below.

$$y = w_{spectrum}^T \cdot (w_{soil}^T \cdot x_{soil}) + w_{other}^T \cdot x_{other} + \text{constant} = \qquad \text{Math. 12}$$
$$w_{spectrum}^T \cdot (w_{soil}^T \cdot (w_{before}^T \cdot x_{before} + + w_{activity}^T \cdot x_{activity})) +$$
$$w_{other}^T \cdot x_{other} + \text{constant}$$

Therefore, the advice creation unit 16 uses Math. 12 shown above and employs linear optimization to efficiently search for the farming content $x_{activity}$ that maximizes y, and thus the advice creation unit 16 can provide the user with the obtained content of farming.

Next, a case in which the prediction model 14 is created based on non-linear regression using a neural network or the like will be described. When non-linear regression is employed, it is generally difficult to analytically determine how explanatory variables affect objective variables.

Therefore, the advice creation unit 16 repeatedly perform trials in which the advice creation unit 16 sets the explanatory variable vector $x_{soil}$ regarding the soil properties to various values, and records the outputs (the prediction values of the objective variables) for these inputs. The advice creation unit 16 can specify, from the record, the explanatory variable vector $x_{soil}$ when the output is the maximum in the trials that have been performed, and set the specified explanatory variable vector $x_{soil}$ as the optimum value.

In this regard, in order to search and find the optimum value more efficiently, if it is possible to calculate the gradient of the prediction model, it is possible to employ a gradient method such as the steepest descent method or a gradient method such as the Newton method. Even when the shape of the prediction model function is unknown (black box), an optimization method such as the Particle Swarm Optimization or the Bayesian Optimization may be employed.

Also, when the content of farming $x_{activity}$ that maximizes the objective variable y is to be obtained, the advice creation unit 16 can obtain the optimum value of $x_{activity}$ by modeling the relationship between $x_{activity}$ and y as in the case of using the linear model, and repeating trials in the same manner as above.

Apparatus Operations

Next, operations of the cultivation-target crop selection assisting apparatus 20 according to the second example embodiment will be described with reference to FIG. 7. FIG. 7 is a flowchart showing operations of the cultivation-target crop selection assisting apparatus according to the second example embodiment of the invention, performed when creating an advice. In the following description, FIG. 6 is referenced when necessary. In the second example embodiment, a cultivation-target crop selection assisting method is performed by operating the cultivation-target crop selection assisting apparatus 20. Therefore, a description of the cultivation-target crop selection assisting method according to the second example embodiment is substituted with the following description of the cultivation-target crop selection assisting apparatus 20.

Prediction models are generated by carrying out steps A1 and A2 shown in FIG. 4, and a cultivation-target crop is selected by carrying out steps B1 to B3 shown in FIG. 5, in the second example embodiment as well.

As shown in FIG. 7, first, the advice creation unit 16 accepts a specification of a type from the user (step C1). Specifically, the user specifies the variety for which the user needs an advice, via the terminal apparatus.

Next, the advice creation unit 16 acquires the prediction model 14 for the variety specified in step C1, in order to create an advice regarding soil improvements for the variety specified in step C1 (step C2).

Next, the advice creation unit 16 creates an advice, using the acquired prediction model 14 (step C3). Specifically, if the prediction model 14 is a linear model, the advice creation unit 16 determines whether the weight value is positive or negative, using Math. 7 shown above, and creates an advice based on the result of determination.

Thereafter, the advice creation unit 16 transmits the created advice to the user's terminal apparatus, and provides the user with the advice via the terminal apparatus (step C4).

Effects of Second Example Embodiment

As described above, according to the second example embodiment, it is possible to provide the user with an advance regarding soil improvements for the cultivated land. Therefore, the user can also select a cultivation-target crop on the premise of soil improvements. In addition, the second example embodiment can achieve the same effect as the first example embodiment.

A program according to the present example embodiment need only be a program that causes a computer to carry out steps A1 and A2 shown in FIG. 4, steps B1 to B3 shown in FIG. 5, and also steps C1 to C4 shown in FIG. 7. By installing such a program in a computer and executing the program, it is possible to realize the cultivation-target crop selection assisting apparatus 20 and the cultivation-target crop selection assisting method according to the second example embodiment. In this case, a processor of the computer functions as the information collection unit 11, the prediction value calculation unit 12, the crop selection unit 13, the prediction model creation unit 15, and the advice creation unit 16, and performs processing.

The program according to the second example embodiment may be executed by a computer system that is constituted by a plurality of computers. In such a case, the computers may respectively function as the information collection unit 11, the prediction value calculation unit 12, the crop selection unit 13, the prediction model creation unit 15, and the advice creation unit 16.

Physical Configuration

Figure 8:
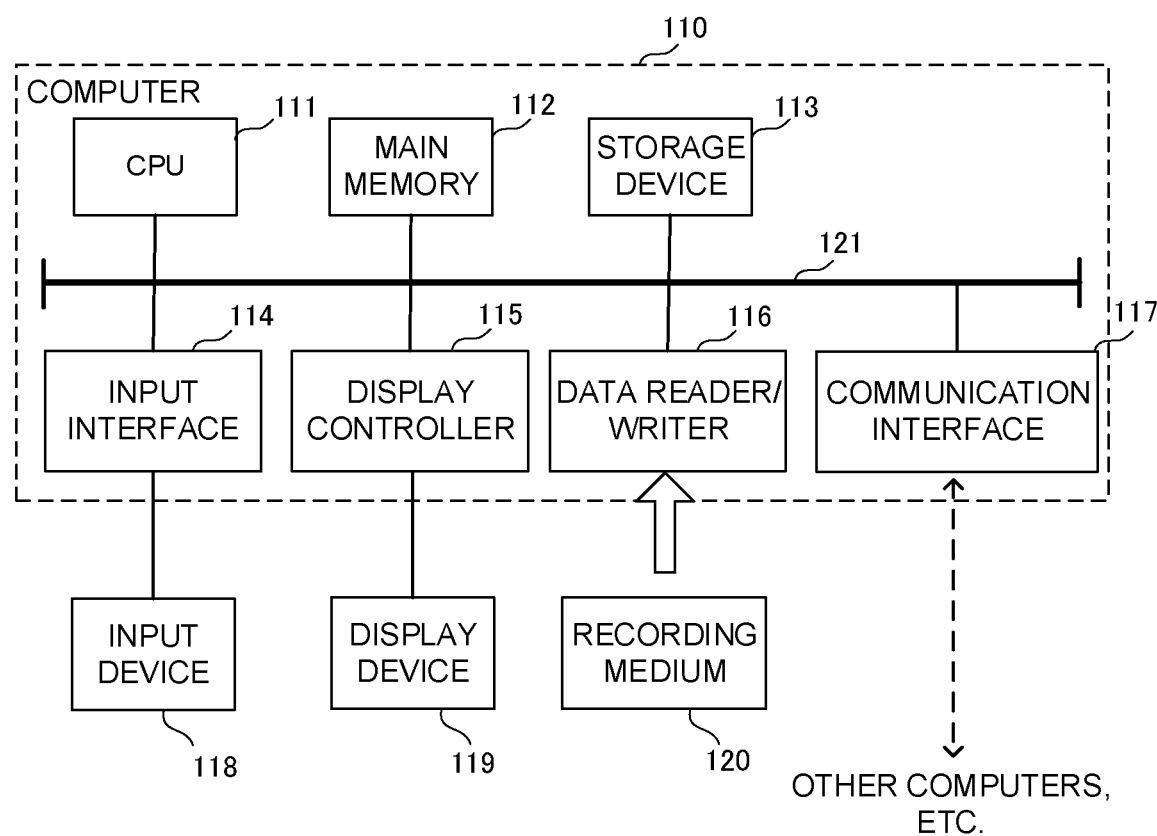
FIG. 8 is a block diagram showing an example of a computer that realizes the cultivation-target crop selection assisting apparatuses according to the first and second example embodiments of the invention.

The following describes a computer that realizes a cultivation-target crop selection assisting apparatus by executing a program according to the first example embodiment or the second example embodiment, with reference to FIG. 8. FIG. 8 is a block diagram showing an example of a computer that realizes the cultivation-target crop selection assisting apparatuses according to the first and second example embodiments of the invention.

As shown in FIG. 8, a computer 110 includes a CPU (Central Processing Unit) 111, a main memory 112, a storage apparatus 113, an input interface 114, a display controller 115, a data reader/writer 116, and a communication interface 117. These units are connected via a bus 121 so as to be able to perform data communication with each other. Note that the computer 110 may include a GPU (Graphics Processing Unit) or an FPGA (Field-Programmable Gate Array) in addition to the CPU 111 or instead of the CPU 111.

The CPU 111 loads a program (codes) according to the present example embodiments stored in the storage device 113 to the main memory 112, and executes them in a predetermined order to perform various kinds of computations. The main memory 112 is typically a volatile storage device such as a DRAM (Dynamic Random Access Memory). Also, the program according to the present example embodiments is provided in the state of being stored in a computer-readable recording medium 120. Note that the program according to the present example embodiments may be distributed on the Internet that is connected via the communication interface 117.

Specific examples of the storage device 113 include a hard disk drive, and a semiconductor storage device such as a flash memory. The input interface 114 mediates data transmission between the CPU 111 and an input device 118 such as a keyboard or a mouse. The display controller 115 is connected to a display apparatus 119, and controls display on the display apparatus 119.

The data reader/writer 116 mediates data transmission between the CPU 111 and the recording medium 120, and reads out the program from the recording medium 120 and writes the results of processing performed in the computer 110 to the recording medium 120. The communication interface 117 mediates data transmission between the CPU 111 and another computer.

Specific examples of the recording medium 120 include general-purpose semiconductor storage devices such as a CF (Compact Flash (registered trademark)) and an SD (Secure Digital), a magnetic recording medium such as a flexible disk, and an optical recording medium such as a CD-ROM (Compact Disk Read Only Memory).

Note that the cultivation-target crop selection assisting apparatuses according to the first and second example embodiments may be realized using pieces of hardware corresponding to the units, instead of a computer in which a program is installed. Furthermore, part of the cultivation-target crop selection assisting apparatuses may be realized using a program, and the rest may be realized using hardware.

At least one or all of the above-described example embodiments can be expressed as, but are not limited to, Supplementary Notes 1 to 15 described below.

Supplementary Note 1

A cultivation-target crop selection assisting apparatus including:

an information collection unit configured to collect information regarding a specific cultivated land;

a prediction value calculation unit configured to calculate a prediction value of actual performance of cultivation of one or a plurality of varieties of crops in the specific cultivated land by applying the information collected by the information collection unit to a prediction model created by performing machine learning on a relationship between information regarding a sample cultivated land and actual performance information regarding a crop produced in the sample cultivated land; and a crop selection unit configured to select a crop that is suitable for being cultivated in the specific cultivated land based on the prediction value calculated for the one or plurality of varieties of crops.

Supplementary Note 2

The cultivation-target crop selection assisting apparatus according to Supplementary Note 1, further including a prediction model creation unit configured to create the prediction model by performing machine learning using the information regarding the sample cultivated land as an explanatory variable and the actual performance information regarding the crop produced in the sample cultivated land as an objective variable.

Supplementary Note 3

The cultivation-target crop selection assisting apparatus according to Supplementary Note 2, wherein the information regarding the specific cultivated land and the information regarding the sample cultivated land include information regarding soil properties of the cultivated land, and the cultivation-target crop selection assisting apparatus further includes an advice creation unit configured to create an advice regarding soil improvements for the specific cultivated land, based on an amount of a change in the explanatory variable when the objective variable is increased in the prediction model, and a weight set to the explanatory variable in the prediction model.

Supplementary Note 4

The cultivation-target crop selection assisting apparatus according to Supplementary Note 1 or 2, wherein the information regarding the specific cultivated land and the information regarding the sample cultivated land include information regarding soil properties of the cultivated land and environmental information regarding the cultivated land.

Supplementary Note 5

The cultivation-target crop selection assisting apparatus according to Supplementary Note 1 or 2, wherein the information regarding the specific cultivated land and the information regarding the sample cultivated land include soil optical reflectance spectrum data measured in the cultivated land.

Supplementary Note 6

A cultivation-target crop selection assisting method including:

(a) a step of collecting information regarding a specific cultivated land;

(b) a step of calculating a prediction value of actual performance of cultivation of one or a plurality of varieties of crops in the specific cultivated land by applying the information collected in the (a) step to a prediction model created by performing machine learning on a relationship between information regarding a sample cultivated land and actual performance information regarding a crop produced in the sample cultivated land; and (c) a step of selecting a crop that is suitable for being cultivated in the specific cultivated land based on the prediction value calculated for the one or plurality of varieties of crops.

Supplementary Note 7

The cultivation-target crop selection assisting method according to Supplementary Note 6, further including (d) a step of creating the prediction model by performing machine learning using the information regarding the sample cultivated land as an explanatory variable and the actual performance information regarding the crop produced in the sample cultivated land as an objective variable.

Supplementary Note 8

The cultivation-target crop selection assisting method according to Supplementary Note 7, wherein the information regarding the specific cultivated land and the information regarding the sample cultivated land include information regarding soil properties of the cultivated land, and the cultivation-target crop selection assisting method further includes:

(e) a step of creating an advice regarding soil improvements for the specific cultivated land, based on an amount of a change in the explanatory variable when the objective variable is increased in the prediction model, and a weight set to the explanatory variable in the prediction model.

Supplementary Note 9

The cultivation-target crop selection assisting method according to Supplementary Note 6 or 7, wherein the information regarding the specific cultivated land and the information regarding the sample cultivated land include information regarding soil properties of the cultivated land and environmental information regarding the cultivated land.

Supplementary Note 10

The cultivation-target crop selection assisting method according to Supplementary Note 6 or 7, wherein the information regarding the specific cultivated land and the information regarding the sample cultivated land include soil optical reflectance spectrum data measured in the cultivated land.

Supplementary Note 11

A computer-readable recording medium that includes a program recorded thereon, the program including instructions that cause a computer to carry out:

(a) a step of collecting information regarding a specific cultivated land;

(b) a step of calculating a prediction value of actual performance of cultivation of one or a plurality of varieties of crops in the specific cultivated land by applying the information collected in the (a) step to a prediction model created by performing machine learning on a relationship between information regarding a sample cultivated land and actual performance information regarding a crop produced in the sample cultivated land; and (c) a step of selecting a crop that is suitable for being cultivated in the specific cultivated land based on the prediction value calculated for the one or plurality of varieties of crops.

Supplementary Note 12

The computer-readable recording medium according to Supplementary Note 11, wherein the program further includes an instruction that causes the computer to carry out (d) a step of creating the prediction model by performing machine learning using the information regarding the sample cultivated land as an explanatory variable and the actual performance information regarding the crop produced in the sample cultivated land as an objective variable.

Supplementary Note 13

The computer-readable recording medium according to Supplementary Note 12, wherein the information regarding the specific cultivated land and the information regarding the sample cultivated land include information regarding soil properties of the cultivated land, and the program further includes an instruction that causes the computer to carry out (e) a step of creating an advice regarding soil improvements for the specific cultivated land, based on an amount of a change in the explanatory variable when the objective variable is increased in the prediction model, and a weight set to the explanatory variable in the prediction model.

Supplementary Note 14

The computer-readable recording medium according to Supplementary Note 11 or 12, wherein the information regarding the specific cultivated land and the information regarding the sample cultivated land include information regarding soil properties of the cultivated land and environmental information regarding the cultivated land.

Supplementary Note 15

The computer-readable recording medium according to Supplementary Note 11 or 12,
wherein the information regarding the specific cultivated land and the information regarding the sample cultivated land include soil optical reflectance spectrum data measured in the cultivated land.

While the present invention has been described above with reference to the example embodiments, the invention is not limited to the example embodiments described above. Various modifications that can be understood by a person skilled in the art may be applied to the configuration and the details of the present invention within the scope of the present invention.

This application claims priority to Japanese Patent Application No. 2018-50198 filed Mar. 16, 2018, the disclosure of which is incorporated herein in its entirety.

INDUSTRIAL APPLICABILITY

As described above, with the invention, it is possible to select a crop that is suitable for being cultivated in a target cultivated land, without specialized knowledge. The invention is useful in the field of agriculture.

LIST OF REFERENCE SIGNS

10: Cultivation-target Crop Selection Assisting Apparatus (First Example Embodiment)
11: Information Collection Unit
12: Prediction Value Calculation Unit
13: Crop Selection Unit
14: Prediction Model
15: Prediction Model Creation Unit
16: Advice Creation Unit
20: Cultivation-target Crop Selection Assisting Apparatus (Second Example Embodiment)
110: Computer
111: CPU
112: Main Memory
113: Storage Device
114: Input Interface
115: Display Controller
116: Data Reader/Writer
117: Communication Interface
118: Input Device
119: Display Apparatus
120: Recording Medium
121: Bus

What is claimed is:

1. A cultivation-target crop selection assisting apparatus comprising:
a memory storing a program; and
a processor configured to run the program to cause the cultivation-target crop selection assisting apparatus to perform:
creating a prediction model by performing machine learning using information regarding a sample cultivated land as an explanatory variable and actual performance information regarding a crop produced in the sample cultivated land as an objective variable, the information regarding the sample cultivated land including information regarding soil properties of the sample cultivated land;
collecting information regarding a specific cultivated land, including information regarding soil properties of the specific cultivated land;
calculating a prediction value of actual performance of cultivation of one or a plurality of varieties of crops in the specific cultivated land by applying the information regarding the specific cultivated land to the prediction model that has been created;
selecting a crop that is suitable for being cultivated in the specific cultivated land based on the prediction value calculated for the one or plurality of varieties of crops; and
creating advice regarding soil improvements for the specific cultivated land, based on an amount of a change in the explanatory variable when the objective variable is increased in the prediction model, and a weight set to the explanatory variable in the prediction model.

2. The cultivation-target crop selection assisting apparatus according to claim 1,
wherein the information regarding the specific cultivated land further includes environmental information regarding the specific cultivated land and the information regarding the sample cultivated land further includes environmental information regarding the sample cultivated land.

3. The cultivation-target crop selection assisting apparatus according to claim 1,
wherein the information regarding the specific cultivated land includes soil optical reflectance spectrum data measured in the specific cultivated land and the information regarding the sample cultivated land includes soil optical reflectance spectrum data measured in the sample cultivated land.

4. A cultivation-target crop selection assisting method comprising:
creating, by a processor, a prediction model by performing machine learning using information regarding a sample cultivated land as an explanatory variable and actual performance information regarding a crop produced in the sample cultivated land as an objective variable, the information regarding the sample cultivated land including information regarding soil properties of the sample cultivated land;
collecting, by the processor, information regarding a specific cultivated land, including information regarding soil properties of the specific cultivated land;
calculating, by the processor, a prediction value of actual performance of cultivation of one or a plurality of varieties of crops in the specific cultivated land by applying the information regarding the specific cultivated land to the prediction model that has been created;
selecting, by the processor, a crop that is suitable for being cultivated in the specific cultivated land based on the prediction value calculated for the one or plurality of varieties of crops; and
creating, by the processor, advice regarding soil improvements for the specific cultivated land, based on an amount of a change in the explanatory variable when the objective variable is increased in the prediction model, and a weight set to the explanatory variable in the prediction model.

5. The cultivation-target crop selection assisting method according to claim 4, wherein the information regarding the specific cultivated land further includes environmental information regarding the specific cultivated land and the information regarding the sample cultivated land further includes environmental information regarding the sample cultivated land.

6. The cultivation-target crop selection assisting method according to claim 4,
wherein the information regarding the specific cultivated land includes soil optical reflectance spectrum data measured in the specific cultivated land and the information regarding the sample cultivated land includes soil optical reflectance spectrum data measured in the sample cultivated land.

7. A non-transitory computer-readable recording medium storing a program executable by a computer to carry out:
creating a prediction model by performing machine learning using information regarding a sample cultivated land as an explanatory variable and actual performance information regarding a crop produced in the sample cultivated land as an objective variable, the information regarding the sample cultivated land including information regarding soil properties of the sample cultivated land;
collecting information regarding a specific cultivated land, including information regarding soil properties of the specific cultivated land;
calculating a prediction value of actual performance of cultivation of one or a plurality of varieties of crops in the specific cultivated land by applying the information regarding the specific cultivated land to the prediction model that has been created;
selecting a crop that is suitable for being cultivated in the specific cultivated land based on the prediction value calculated for the one or plurality of varieties of crops; and
creating advice regarding soil improvements for the specific cultivated land, based on an amount of a change in the explanatory variable when the objective variable is increased in the prediction model, and a weight set to the explanatory variable in the prediction model.

8. The non-transitory computer-readable recording medium according to claim 7,
wherein the information regarding the specific cultivated land further includes environmental information regarding the specific cultivated land and the information regarding the sample cultivated land further includes environmental information regarding the sample cultivated land.

9. The non-transitory computer-readable recording medium according to claim 7,
wherein the information regarding the specific cultivated land includes soil optical reflectance spectrum data measured in the specific cultivated land and the information regarding the sample cultivated land includes soil optical reflectance spectrum data measured in the sample cultivated land.

* * * * *